US011912289B2

(12) United States Patent
Hüger et al.

(10) Patent No.: US 11,912,289 B2
(45) Date of Patent: Feb. 27, 2024

(54) METHOD AND DEVICE FOR CHECKING AN AI-BASED INFORMATION PROCESSING SYSTEM USED IN THE PARTIALLY AUTOMATED OR FULLY AUTOMATED CONTROL OF A VEHICLE

(71) Applicant: Volkswagen Aktiengesellschaft, Wolfsburg (DE)

(72) Inventors: Fabian Hüger, Wolfenbüttel (DE); Peter Schlicht, Wolfsburg (DE); Nico Maurice Schmidt, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 219 days.

(21) Appl. No.: 17/502,001

(22) Filed: Oct. 14, 2021

(65) Prior Publication Data

US 2022/0118989 A1    Apr. 21, 2022

(30) Foreign Application Priority Data

Oct. 15, 2020   (DE) ..................... 10 2020 213 057.4

(51) Int. Cl.
*B60W 50/04*     (2006.01)
*B60W 50/02*     (2012.01)
(Continued)

(52) U.S. Cl.
CPC ........ *B60W 50/0205* (2013.01); *B60W 50/04* (2013.01); *G07C 5/008* (2013.01);
(Continued)

(58) Field of Classification Search
None
See application file for complete search history.

(56) References Cited

U.S. PATENT DOCUMENTS

2016/0062740 A1* 3/2016 Muthusamy ........ G06F 9/44589
                                                        717/121
2018/0357542 A1* 12/2018 Wu .......................... G06N 3/04
(Continued)

FOREIGN PATENT DOCUMENTS

DE     102016120066 A1    4/2018     ............... G06K 9/62
DE     102018218586 A1    1/2020     ............... G06N 3/08
(Continued)

OTHER PUBLICATIONS

German Office Action, Application No. 102020213057.4, 7 pages, dated May 19, 2021.
(Continued)

*Primary Examiner* — James M McPherson
(74) *Attorney, Agent, or Firm* — Slayden Grubert Beard PLLC

(57) ABSTRACT

The invention relates to a method for checking an AI-based information processing system used in the partially automated or fully automated control of a vehicle, wherein at least one sensor of the vehicle provides sensor data, the captured sensor data are evaluated by an AI-based information processing system arranged in a first control circuit of the vehicle and, from the evaluated sensor data, at least one output for controlling the vehicle is generated. The AI-based information processing system is checked by a testing circuit arranged in a second control circuit of the vehicle using at least one testing method, and wherein a test result of the at least one testing method is stored, with a reference to the tested AI-based information processing system and to the at least one testing method used, in a multi-dimensional data structure in a database arranged in the vehicle.

20 Claims, 2 Drawing Sheets

(51) Int. Cl.
  *G07C 5/00* (2006.01)
  *G07C 5/08* (2006.01)
  *G07C 5/10* (2006.01)
(52) U.S. Cl.
  CPC ............... *G07C 5/085* (2013.01); *G07C 5/10* (2013.01); *B60W 2050/0215* (2013.01); *B60W 2050/041* (2013.01); *B60W 2710/207* (2013.01); *B60W 2720/10* (2013.01); *B60W 2720/12* (2013.01)

(56) References Cited

U.S. PATENT DOCUMENTS

| | | | |
|---|---|---|---|
| 2019/0122096 A1 | 4/2019 | Husain | |
| 2019/0331768 A1* | 10/2019 | Harrison | G06F 18/217 |
| 2019/0370660 A1 | 12/2019 | Wong et al. | |
| 2020/0249314 A1* | 8/2020 | Eshet | G01S 7/417 |
| 2020/0249315 A1* | 8/2020 | Eshet | G01S 13/343 |
| 2020/0302301 A1* | 9/2020 | Anderson | G06N 3/08 |
| 2021/0018609 A1* | 1/2021 | Zhu | G01S 13/48 |
| 2021/0157824 A1 | 5/2021 | Engel et al. | |
| 2021/0182707 A1* | 6/2021 | Weyrich | G06N 20/00 |
| 2021/0279589 A1* | 9/2021 | Lee | G06F 17/16 |
| 2022/0026556 A1* | 1/2022 | Spata | G06V 20/52 |
| 2022/0026568 A1* | 1/2022 | Meuter | G06N 3/045 |
| 2022/0057485 A1* | 2/2022 | Chi | G01S 13/931 |

FOREIGN PATENT DOCUMENTS

| | | | |
|---|---|---|---|
| EP | 3435295 A1 | 1/2019 | G06N 99/00 |
| WO | 2019/211497 A2 | 11/2019 | G06K 9/036 |

OTHER PUBLICATIONS

Nystrom, D. et al., "Data Management Issues in Vehicle Control Systems: A Case Study," IEEE Proceedings of the 14$^{th}$ Euromicro Conference on Real-Time Systems, 8 pages, Jun. 19, 2002.
Cheng, Chih-Hong et al., "Runtime Monitoring Neuron Activation Patterns," IEEE 2019 Design, Automation & Test in Europe Conference & Exhibition, URL: https://arxiv.org/pdf/1809.06573.pdf, 4 pages, Sep. 19, 2018.
Extended European Search Report, Application No. 21197298.9, 11 pages, dated Mar. 14, 2022.

* cited by examiner

METHOD AND DEVICE FOR CHECKING AN AI-BASED INFORMATION PROCESSING SYSTEM USED IN THE PARTIALLY AUTOMATED OR FULLY AUTOMATED CONTROL OF A VEHICLE

CROSS-REFERENCE TO RELATED APPLICATIONS

This application claims priority to German Patent Application No. DE 10 2020 213 057.4, filed on Oct. 15, 2020 with the German Patent and Trademark Office. The contents of the aforesaid Patent Application are incorporated herein for all purposes.

TECHNICAL FIELD

The invention relates to a method and a device for checking an AI-based information processing system used in the partially automated or fully automated control of a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Machine learning, for example on the basis of neural networks, has great potential for use in modern driver assistance systems and automated driving vehicles. Functions based on deep neural networks process sensor data (for example, from cameras, radar or lidar sensors) to derive relevant information therefrom. This information comprises, for example, a type and a position of objects in surroundings of the motor vehicle, a behavior of the objects, or a road geometry or topology.

A key feature in the development of AI-based information processing systems (training) is in the purely data-driven parameter fitting without the intervention of experts. For example, with deep neural networks, a deviation of an output (for a given parameterization) of the neural network from a ground truth is determined (known as loss). The loss function used here is chosen in such a way that the parameters of the neural network depend on it in a manner that may be differentiated. Using the gradient descent method, in each training step the parameters of the neural network are adapted depending on the derivation of the deviation (which is ascertained from multiple examples). These training steps are repeated very often until the loss no longer decreases.

With this procedure, the parameters of an AI-based information processing system, in particular of a neural network, are ascertained without the appraisal of an expert or semantically motivated modeling. This may have significant consequences for the properties of the AI-based information processing system, in particular of the neural network.

In particular, deep neural networks are largely non-transparent and their calculations cannot be interpreted by humans. This presents a massive limitation for systematic testing or a formal check.

Furthermore, deep neural networks in particular are susceptible to damaging interferences, known as adversarial perturbations: small manipulations to the input data that are barely perceptible to humans or that do not change a semantic input may lead to completely different output data. Such manipulations may be either changes to the data caused maliciously ("neural hacking") or randomly occurring image changes (sensor noise, weather influences, certain colors, or contrasts).

Furthermore, it is for example unclear which input features a neural network is sensitive to. This means that, up until now, data generated synthetically, for example through simulation, could hardly be used successfully for the training of neural networks: neural networks trained in simulation or on otherwise artificial data have an astonishingly weak performance on real sensor data. Executing neural networks in a different data domain (training in summer, execution in winter, etc.) also reduces the functional quality, sometimes drastically. The result of this is that, among other things, the possibility of developing and approving neural networks in simulation (elimination of expensive labeling and costly real tests), which sounds attractive from a cost perspective, does not appear realistic.

The second point in particular is especially important for possible limitations of potent neural networks in the area of functional safety. In order to measure the latter, it is desirable to measure an appraisal of the robustness of the network execution against slight changes (for example, augmentations) of the input data. Since such changes may be varied (sensor noise, weather influences, image manipulation, semantically insignificant content changes, for example, the color of the wall of background buildings), there is no clear and accepted gauge for the robustness. Instead, many robustness values against interferences (for example, augmentations) of various types and intensities may be measured. Furthermore, the robustness of neural networks is not an absolute quantity, but rather depends on current input data.

In addition, it is difficult to generate AI-based information processing systems that are robust against all necessary interferences. Additionally, the extent of possible interferences is infinite, such that novel interferences may occur during operation of a vehicle.

SUMMARY

A need exists to create a method, a device, and a system for checking an AI-based information processing system used in partially automated or fully automated control of a vehicle.

The need is addressed by the subject matter of the independent claims. Embodiments of the invention are described in the dependent claims, the following description, and the drawings.

DESCRIPTION

Figure 1:
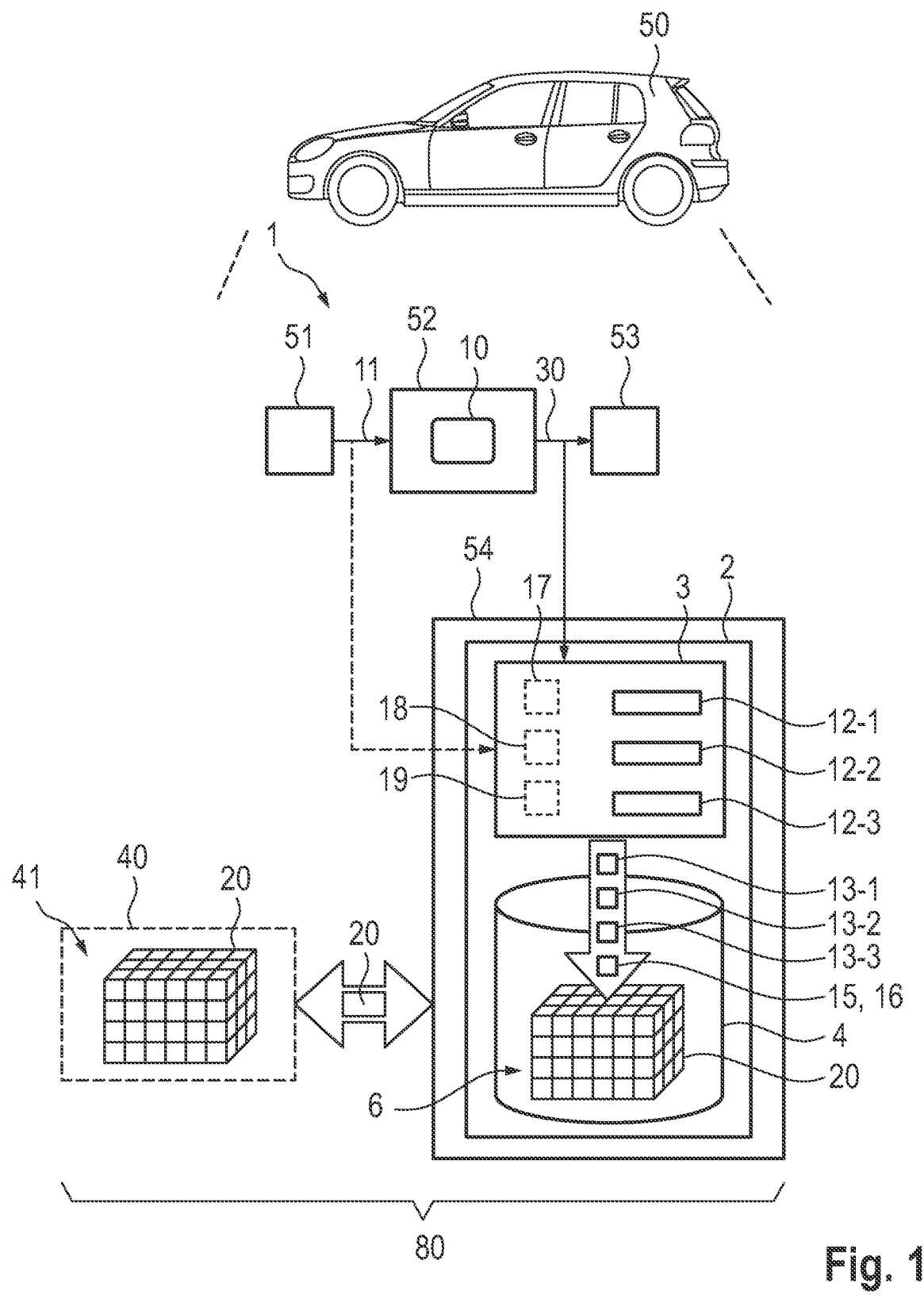
FIG. 1 shows a schematic representation of an embodiment of a device for checking an AI-based information processing system used in the partially automated or fully automated control of a vehicle.

The details of one or more embodiments are set forth in the accompanying drawings and the description below. Other features will be apparent from the description, drawings, and from the claims.

In some embodiments, a method for checking an AI-based information processing system used in the partially automated or fully automated control of a vehicle is provided, wherein at least one sensor of the vehicle provides sensor data for detecting surroundings, the captured sensor data are evaluated by means of an AI-based information processing system arranged in a first control circuit (also referred herein as a 'first control device') of the vehicle and, from the evaluated sensor data, at least one output for the partially automated or fully automated control of the vehicle is generated, and a controller (also referred herein as a 'control unit') of the vehicle is provided, wherein the AI-based information processing system is checked by means of a testing circuit (also referred herein as a 'testing apparatus') arranged in a second control circuit (also referred herein as a 'second control device') of the vehicle by means of at least one testing method, and wherein a test result of the at least one testing method is stored, with a reference to the tested AI-based information processing system and to the at least one testing method used, in a multi-dimensional data structure in a database arranged in the vehicle. In some embodiments, for example continuous maintenance and/or updating of a data pool is possible. Furthermore and in some embodiments, a device for checking an AI-based information processing system used in the partially automated or fully automated control of a vehicle is provided, having at least one sensor that is configured to provide sensor data for detecting surroundings of an environment of the vehicle, an AI-based information processing system arranged in a first control circuit of the vehicle, which system is configured to evaluate the captured sensor data and, from the evaluated sensor data, to generate and provide at least one output for the partially automated or fully automated control of the vehicle, a controller that uses the provided output as a control parameter for the partially automated or fully automated control of the vehicle, and a testing circuit arranged in a second control circuit of the vehicle, which apparatus is configured to check the AI-based information processing system by means of at least one testing method, and to store a test result of the at least one testing method, with a reference to the tested AI-based information processing system and to the at least one testing method used, in a multi-dimensional data structure in a database arranged in the vehicle.

The method and the device may make it possible to check an AI-based information processing system used in the partially automated or fully automated control of a vehicle during use and as a result expand and/or update a data pool for checking and assessing the AI-based information processing system. For example, the AI-based information processing system may be assessed with regard to robustness at a later point in time by accessing the test results saved in the multi-dimensional data structure. During the use of the AI-based information processing system, it may be provided that the AI-based information processing system is checked by means of at least one testing method. A test result of the at least one testing method is saved in a multi-dimensional data structure in a database arranged in the vehicle, wherein a link to a reference to the tested AI-based information processing system and to the at least one testing method used takes place so that the test result may be used later to check and/or assess the AI-based information processing system and for this purpose may be called up from the multi-dimensional data structure in a targeted manner.

A benefit of the method and the device is that checking and collecting test results for AI-based information processing systems used in the partially automated or fully automated control of a vehicle may take place continuously when using the AI-based information processing systems. As a result, a data pool for checking and/or assessing may be expanded and/or updated in steps and for example continuously.

An AI-based information processing system is for example an information processing system that is based on a method of artificial intelligence (AI). For example, the AI-based information processing system may be designed as a deep neural network or at least comprise one, without limitation. In principle, the method described in this disclosure may, however, also be used in other AI-based information processing systems, for example, in rule-based information processing systems. The at least one AI-based information processing system is for example trained and/or finally parameterized. For example, the AI-based information processing system may be a trained neural network. An AI-based information processing system comprises for example a structure description and parameters and/or is defined by a structure description and parameters.

A testing method is for example an unmonitored testing method, meaning, for an output of the AI-based information processing system, no ground truth is known when checking. The testing method is for example performed such that a run of the AI-based information processing system is not interfered with, or respectively is not changed. The testing method behaves passively in relation to the AI-based information processing system to be checked. In other words, the testing method only observes the AI-based information processing system.

A sensor is for example a camera, a lidar sensor, a radar sensor, or an ultrasonic sensor, without limitation. The sensor data may be one or multi-dimensional, for example two- or three-dimensional. If the sensor is designed as a camera, the sensor data comprises for example two-dimensional camera images.

Parts of the device, for example the first control circuit, the second control circuit, the controller, and/or the testing circuit, may be designed individually or together as a combination of hardware and software, for example as program code that is executed in a micro-controller or a microprocessor.

It may be provided that the multi-dimensional data structure already exists and, for example, is transmitted from a central server to the device and is used there, for example, to check and assess a robustness of AI-based information processing systems before use. The test results generated according to the method described in this disclosure are added to the provided multi-dimensional data structure for example as a new entry so that the multi-dimensional data structure is expanded by the test results. However, the already existing entries or respectively data points in the multi-dimensional data structure may also be updated. The multi-dimensional data structure is stored for example in a database. On the central server, the database is for example described as a centralized database; in the device, the database is for example described as a decentralized database.

A multi-dimensional data structure may be defined, for example, by the dimensions of AI-based information processing system, data set, data augmentation definition and degree of difference definition. A multi-dimensional data structure may for example also be described as a hypercube. The AI-based information processing system dimension comprises, as a value range, for example all provided AI-based information processing systems (insofar as more than one AI-based information processing system is present or respectively is to be used and/or checked). If only one AI-based information processing system is present or respectively is to be used and/or checked, the AI-based information processing system dimension may also be omitted. The data set dimension comprises, for example as a value range, all provided data sets with which the AI-based information processing systems referenced in the multi-dimensional data structure transmitted to the device have already been checked. The data augmentation definition dimension comprises, as a value range, for example all data augmentation methods with which AI-based information processing systems referenced in the multi-dimensional data structure have already been augmented for checking. The degree of difference definition dimension comprises, as a value range, for example all degrees of difference already used for checking. Each combination of values within these dimensions is assigned a data point that comprises at least one difference value. Test results that have been attained by means of the method described in this disclosure are added to such a multi-dimensional data structure as data points. In this case, not all of the dimensions present in the multi-dimensional data structure have to be taken into account. For example, the testing methods of the method described in this disclosure do not provide any difference values, since they are unmonitored testing methods. In other words, an obtained test result is added to the multi-dimensional data structure for example as at least one new data point. For the unmonitored testing methods, the multi-dimensional data structure has for example the dimensions of AI-based information processing system, testing method, properties of the sensor data, and/or context.

A data set comprises for example data. The data may be for example one-dimensional or multi-dimensional, for example two-dimensional. For example, the data may be images from a camera or a lidar sensor. In principle, however, any sensor data may be used.

A data augmentation definition defines for example a data augmentation or a data augmentation method. The data augmentation definition indicates how data in the data set are to be changed when generating the multi-dimensional data structure. In this case, a plurality of changes may be provided. Examples include: adding noise, adding one or more adversarial perturbations and/or sensor interferences, changing a contrast, changing a brightness, changing colors, changing a weather condition (e.g., adding snow or rain in a camera image that was captured in the summer during sunshine). A data augmentation or respectively a data augmentation method is designed or respectively defined for example depending on physical sensor properties (interferences, etc.) and/or possible physical and/or technical interferences to the sensor system and/or possible adversarial perturbations.

A degree of difference definition defines for example a degree of difference. The degree of difference indicates for example how output data of an AI-based information processing system that was generated for (non-augmented) data of the data set should be compared, when generating the multi-dimensional data structure, to output data of the AI-based information processing system that was generated for augmented data. If the AI-based information processing system outputs, for example, a vector as output data, a degree of difference may comprise comparing the vectors, for example, in that a difference between the vectors is determined. A simple example of another degree of difference is the following: If the AI-based information processing system outputs, for example, how many pedestrians are present in a captured camera image as output data, the number output in each case for the data and the augmented data may be compared to each other (e.g., 3 pedestrians compared to 5 pedestrians, so that the difference value is equal to 2 pedestrians).

If temporally sequential data is saved in a data set, a degree of difference may also relate to temporally sequential, meaning temporally adjacent, data. As a result, a data pool for assessing robustness during processing of video sequences (or other temporally sequential data) may be generated and provided by an AI-based information processing system. For example, it may be checked during the robustness assessment whether or not a pedestrian in a video sequence is reliably recognized as a pedestrian across multiple individual video images.

All artifacts that are significant in generating the multi-dimensional data structure may also be saved as metadata and/or headers in the multi-dimensional data structure. These artifacts comprise, for example: references to a software code used, references to the at least one AI-based information processing system and to hyperparameters used for training, references to one or more data sets used (including, if applicable, of description data), and/or initial values used for random generators used ("random seeds").

The multi-dimensional data structure forms for example a type of test database, with which test results that were attained on a central server under a variety of conditions for a variety of AI-based information processing systems may be expanded to include test results that were attained during operation while using an AI-based information processing system according to the method described in this disclosure. Using the test results in the multi-dimensional data structure, the AI-based information processing systems may be assessed and evaluated with regard to robustness in an improved manner. For example, the provided multi-dimensional data structure allows, under given conditions (properties of the sensor data, context, etc.), a robust AI-based information processing system to be selected for use.

Before the method described in this disclosure is performed, the multi-dimensional data structure may for example be generated on a central server, for example by a method for providing a data pool for assessing robustness of at least one AI-based information processing system, wherein at least one AI-based information processing system, at least one data set, at least one data augmentation definition, and at least one degree of difference definition are received as input parameters, wherein, based on the input parameters, a multi-dimensional data structure is generated, wherein the dimensions and value ranges of the dimensions of the multi-dimensional data structure are established by the received input parameters, and wherein each data point in the multi-dimensional data structure comprises a difference value determined by means of the at least one defined degree of difference, which difference value is determined in that the at least one defined degree of difference is formed between output data that were generated by the at least one AI-based information processing system in each case for data of the at least one data set and for the same data augmented by means of the at least one defined data augmentation, and wherein the generated multi-dimensional data structure is provided so that a robustness of the at least one AI-based information processing system may be assessed based on the difference values comprised by the multi-dimensional data structure. Then, the multi-dimensional data structure is transmitted to the device so that it may be expanded and/or updated there with additional test results by means of the method described in this disclosure for checking an AI-based information processing system used in the partially automated or fully automated control of a vehicle.

The method and the device may for example be used in a vehicle. A vehicle is for example a motor vehicle. In principle, the vehicle can, however, also be another land vehicle, watercraft, aircraft, or spacecraft, without limitation. An aircraft is for example a drone or a partially automated or automated air taxi. The method may in principle also be used in the area of production or logistics, for example, for monitoring or in robotics.

In some embodiments, it is provided that the output is at least one object from the sensor data and classified by the AI-based information processing system, or a controlling output such as a steering angle, a speed, or a trajectory.

In some embodiments, it is provided that at least one piece of context information of a context in which the sensor data is captured is determined, wherein the at least one determined piece of context information is saved in the multi-dimensional data structure in addition to the test result. As a result, test results that are linked to a context in which the sensor data was captured may be saved in the multi-dimensional data structure. At a later point in time, already existing test results for a given context may be called up from the multi-dimensional data structure and used to assess and evaluate a robustness of an AI-based information processing system in the same context. This allows for example a context-dependent assessment and evaluation of a robustness of an AI-based information processing system. A context may comprise, for example, information about surroundings in which the sensor data were captured, e.g., a speed of the vehicle, a time of day, a weekday, a season, an environment and/or a location (e.g., city, country, residential street, highway, etc.), and/or weather conditions (e.g., rain, snow, fog, etc.). The at least one piece of context information is determined, for example, by means of a context determination apparatus, provided for this purpose, of the device.

In some embodiments, it is provided that properties of the captured sensor data are determined, wherein the determined properties are saved in the multi-dimensional data structure in addition to the test result. As a result, test results that are linked to properties of the captured data may be saved in the multi-dimensional data structure. At a later point in time, already existing test results for similar sensor data, meaning sensor data with the same properties, may be called up from the multi-dimensional data structure and used to assess and evaluate a robustness of an AI-based information processing system when feeding in the similar sensor data. This allows for example an assessment and evaluation of a robustness of an AI-based information processing system depending on properties of the sensor data. Properties of the sensor data may comprise, for example, one or more of the following: an interference in the sensor data, such as an adversarial perturbation or noise; furthermore, photometric properties such as a brightness, a contrast, a color saturation, a color shade, etc. The properties of the sensor data may be determined, for example, by means of computer vision methods or by means of trained machine learning methods, such as autoencoders or generative adversarial networks (GANs). The properties are determined, for example, by means of a property determination apparatus provided for this purpose and/or by means of at least one interference detection apparatus of the device.

In some embodiments, it is provided that the at least one testing method comprises determining and/or checking a consistency of the at least one output over time. As a result, a reliability or respectively robustness of an output may be assessed over time. For example, the extent to which an output of an AI-based information processing system changes or remains the same with time is checked. In this case, it can, for example, be checked and assessed whether the output changes abruptly with time and/or oscillates, etc. If the considered AI-based information processing system serves, for example, for object recognition and/or object classification in captured camera images, it may be checked for a recognized object whether an object class assigned to the recognized object changes or remains constant over time. If the object class changes repeatedly, a consistency of the AI-based information processing system is low; if, on the other hand, the assigned object class remains constant over time, the consistency is high. A high consistency is an indication that the AI-based information processing system functions well, meaning robustly, under the given conditions (e.g., properties of the sensor data and/or context, etc.). In the multi-dimensional data structure, one or more corresponding test results for the checked AI-based information processing system are then saved, for example, with the reference to the testing method "(temporal) consistency."

In some embodiments, it is provided that the at least one testing method comprises determining and/or checking a confidence of the at least one output. In doing so, it may be assessed how well, meaning how reliably or respectively robustly, the AI-based information processing system works, for example under the given conditions. Such a confidence is estimated and provided for example by the AI-based information processing system itself. If the AI-based information processing system is, for example, a neural network that performs an object classification in captured camera data, the neural network delivers as an output estimated values for the various object classes. If an object class is assigned a high estimated value (e.g., 99%), the confidence is greater than if the object class is only assigned a lower estimated value (e.g., 30%) and the remaining probability is distributed across many other object classes. In the multi-dimensional data structure, one or more corresponding test results for the checked AI-based information processing system are then saved, for example, with the reference to the testing method "confidence."

In some embodiments, it is provided that the at least one testing method comprises checking the plausibility of the at least one output. In doing so, an output of an AI-based information processing system may be compared with outputs of other AI-based information processing systems and/or an (overall) context. Outputs that were generated for captured sensor data from different sensors may also be compared with each other. In the case of a large correspondence of the outputs, a plausibility of the output of the checked AI-based information processing system is high; in the case of lower correspondence, accordingly lower. In the multi-dimensional data structure, one or more corresponding test results for the checked AI-based information processing system are then saved, for example, with the reference to the testing method "plausibility." The reference may in this case comprise additional information about a type of plausibility checking.

In some embodiments, it is provided that the multi-dimensional data structure is synchronized with centralized multi-dimensional data structure that is stored in a centralized database on a central server and/or with a decentralized multi-dimensional data structure that is stored on a decentralized database. As a result, the newly attained test results may be shared with a general infrastructure, for example with other vehicles. In this way, a data pool for assessing and evaluating a robustness of AI-based information processing systems may be continuously expanded and/or updated. In this case, synchronizing comprises for example an exchange of information in both directions.

In some embodiments, it is provided that the AI-based information processing system provides a function for automated driving of the vehicle and/or for a driver assistance system of the vehicle and/or for detecting surroundings and/or sensing surroundings.

In some embodiments, it is provided that the AI-based information processing system is a neural network and/or comprises at least one neural network. The neural network is for example a deep neural network, for example a convolutional network.

Additional features of the design of the device are apparent from the description of further embodiments in the following. The benefits of the device in this context are the same as the designs of the method.

Furthermore and in some embodiments, a system for checking an AI-based information processing system used in the partially automated or fully automated control of a vehicle is also provided, comprising at least one, for example decentralized, device for checking an AI-based information processing system used in the partially automated or fully automated control of a vehicle according to one of the embodiments described herein, and a central server, wherein at least one multi-dimensional data structure is saved in a centralized database on the central server, and wherein the central server is configured to generate the multi-dimensional data structure and/or to transmit it to the, for example decentralized, device and/or to synchronize the at least one multi-dimensional data structure with a multi-dimensional data structure of the at least one, for example decentralized, device.

The method, the device, and the system may be designed as part of a device, a system, or a method, respectively, for the partially automated or fully automated control of a vehicle.

Such a method in some embodiments may provide that sensor data for detecting surroundings is provided by means of at least one sensor of the vehicle, the captured sensor data are evaluated by means of an AI-based information processing system arranged in a first control circuit of the vehicle and, from the evaluated sensor data, at least one output for partially automated or fully automated control of the vehicle is generated and provided to a controller of the vehicle, wherein properties of the sensor data and/or a current context in which the sensor data are captured is determined by means of an analysis circuit/apparatus arranged in a second control circuit of the vehicle, wherein the AI-based information processing system is selected from a plurality of AI-based information processing systems available by means of a selection circuit/apparatus arranged in a second control circuit, wherein the selection takes place using a multi-dimensional data structure in which, for each of the plurality of AI-based information processing systems, test results for at least one testing method in each case are saved depending on properties of sensor data and/or depending on a context and that is stored in a database arranged in the vehicle, wherein, from the multi-dimensional data structure, a robustness of each of the plurality of AI-based information processing systems is determined and assessed under the condition that the determined properties and/or the determined context is present, and wherein the most robust AI-based information processing system is selected and used to evaluate the captured sensor data in the first control circuit.

A robustness is determined for example from at least one robustness metric. The robustness metric indicates for example how test results saved in the multi-dimensional data structure (for example difference values and test results from unmonitored testing methods) are to be combined to form one or more robustness values. The robustness value or values obtained for the individual AI-based information processing systems may then be compared to each other and/or to a threshold.

The device may also be configured to execute the method, described in the preceding section, for the partially automated or fully automated control of a vehicle with the provision of a robust AI-based information processing system.

In the following, the invention will be explained in greater detail based on further exemplary embodiments and with reference to the drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic representation of an embodiment of the device 1 for checking an AI-based information processing system 10 used in the partially automated or fully automated control of a vehicle. The AI-based information processing method 10 is operated for sensor data evaluation in a vehicle 50. The AI-based information processing system 10 may be, for example, a trained deep neural network.

The device 1 comprises a sensor 51 that is configured to provide sensor data 11 for detecting surroundings in an environment of the vehicle 50. The sensor 51 may be, for example, a camera, with which camera images of surroundings of the vehicle 50 are captured as sensor data 11.

Furthermore, the device 1 comprises an AI-based information processing system 10 arranged in a first control circuit 52 of the vehicle 50, which system is configured to evaluate the captured sensor data 11 and, from the evaluated sensor data 11, to generate and provide at least one output 30 for the partially automated or fully automated control of the vehicle 50. It may be provided that the control circuit 52 is part of the device 1.

In this case, it may be provided that the output 30 is at least one object from the sensor data 11 and classified by the AI-based information processing system 10, or a controlling output 30 such as a steering angle, a speed, or a trajectory.

Furthermore, the device 1 comprises a controller 53 that uses the provided output 30 as a control parameter for the partially automated or fully automated control of the vehicle 50. The controller 53 is, for example, a trajectory planner or an actuator control system of the vehicle 50.

The device 1 also comprises a testing circuit 2 arranged in a second control circuit 54 of the vehicle 50. The second control circuit 54 is for example part of the device 1. The testing circuit 2 comprises a computing apparatus (e.g., a computer) 3 and a memory 4.

The device 1 is configured for example to execute the method described in this disclosure for checking an AI-based information processing system 10 used in partially automated or fully automated control of a vehicle 50.

For example, it is provided that the AI-based information processing system 10 provides a function for automated driving of the vehicle 50 and/or for a driver assistance system of the vehicle 50 and/or for detecting surroundings and/or sensing surroundings.

The manner of operation of the device 1 is shown by way of example for a single AI-based information processing system 10. In principle, however, multiple AI-based information processing systems 10 operated in parallel may also be checked simultaneously.

The testing circuit 2 is configured to check the AI-based information processing system 10 by means of at least one testing method 12-$x$, and to store a test result 13-$x$ of the at least one testing method 12-$x$, with a reference to the tested AI-based information processing system 10 and to the at least one testing method 12-$x$ used, in a multi-dimensional data structure 20 in a database 6 arranged in the vehicle 50. The at least one testing method 12-$x$ is for example an unmonitored testing method.

For this purpose, the at least one output 30 is supplied to the testing circuit 2. This takes place for example on an ongoing basis or respectively continuously during the use of the AI-based information processing system 10.

It may be provided that a testing method 12-1 comprises determining and/or checking a consistency of the at least one output 30 over time. For this purpose, outputs 30 are compared to each other over time with regard to a deviation and/or correspondence. If an output 30 comprises, for example, an object class estimated by the AI-based information processing system 10, it is checked in the testing method 12-1 whether or not the object class estimated for an object changes over time. The test result 13-1 is saved in the multi-dimensional data structure 20.

It may be provided that a testing method 12-2 comprises determining and/or checking a confidence of the at least one output 30. Typically, the outputs 30 generated by AI-based information processing systems 10 comprise information about probabilities of each output 30. In one example, in which object classes for objects imaged in camera images are estimated by means of a neural network, the neural network delivers a probability that the imaged object belongs to one of the object classes as an output 30 for each of the possible object classes. These probabilities may be used as confidence to check a reliability or respectively robustness of the neural network. The test result 13-2, meaning the confidence(s), is saved in the multi-dimensional data structure 20.

It may be provided that a testing method 12-3 comprises checking the plausibility of the at least one output 30. The plausibility may be checked using a context and/or using outputs 30 of other AI-based information processing systems 10.

It may be provided that at least one piece of context information 15 of a context in which the sensor data 11 is captured is determined, wherein the at least one determined piece of context information 15 is saved in the multi-dimensional data structure 20 in addition to the test result 13-$x$. For this purpose, the captured sensor data 11 may be supplied to the second control circuit 54, for example the computing apparatus 3, wherein a context is recognized and the at least one piece of context information 15 is determined by means of a pattern recognition method, for example, on the basis of a trained machine learning method. A piece of context information may comprise, for example, a piece of information about a location (city, country, highway, residential street, garage entrance, etc.), a time (day, night, summer, winter, etc.), and/or circumstances (weather, light conditions, traffic volume, etc.). To determine the at least one piece of context information 15, the device 1, for example the computing apparatus 3, comprises for example a context determination apparatus 19.

It may be provided that properties 16 of the captured sensor data 11 are determined, wherein the determined properties 16 are saved in the multi-dimensional data structure 20 in addition to the test result 13-$x$. If the sensor 51 is, for example, a camera, the properties may comprise for example photometric properties of captured camera images, for example, a brightness, a contrast, etc. To determine the properties 16, the device 1, for example the computing apparatus 3, comprises for example a property determination apparatus 18. Furthermore, the device 1, for example the computing apparatus 3, may comprise an interference detection apparatus 17 to detect adversarial perturbations (as properties of the sensor data 11).

In some embodiments, it is provided that the multi-dimensional data structure 20 is synchronized with a centralized multi-dimensional data structure 20 that is stored in a centralized database 41 on a central server 40 and/or with a decentralized multi-dimensional data structure 20 that is stored in a decentralized database 6 of another vehicle (not shown). Here, it may be provided for example that only one expanded and/or changed part of the multi-dimensional data structure 20 is transmitted for synchronization in order to reduce a data volume.

Figure 2:
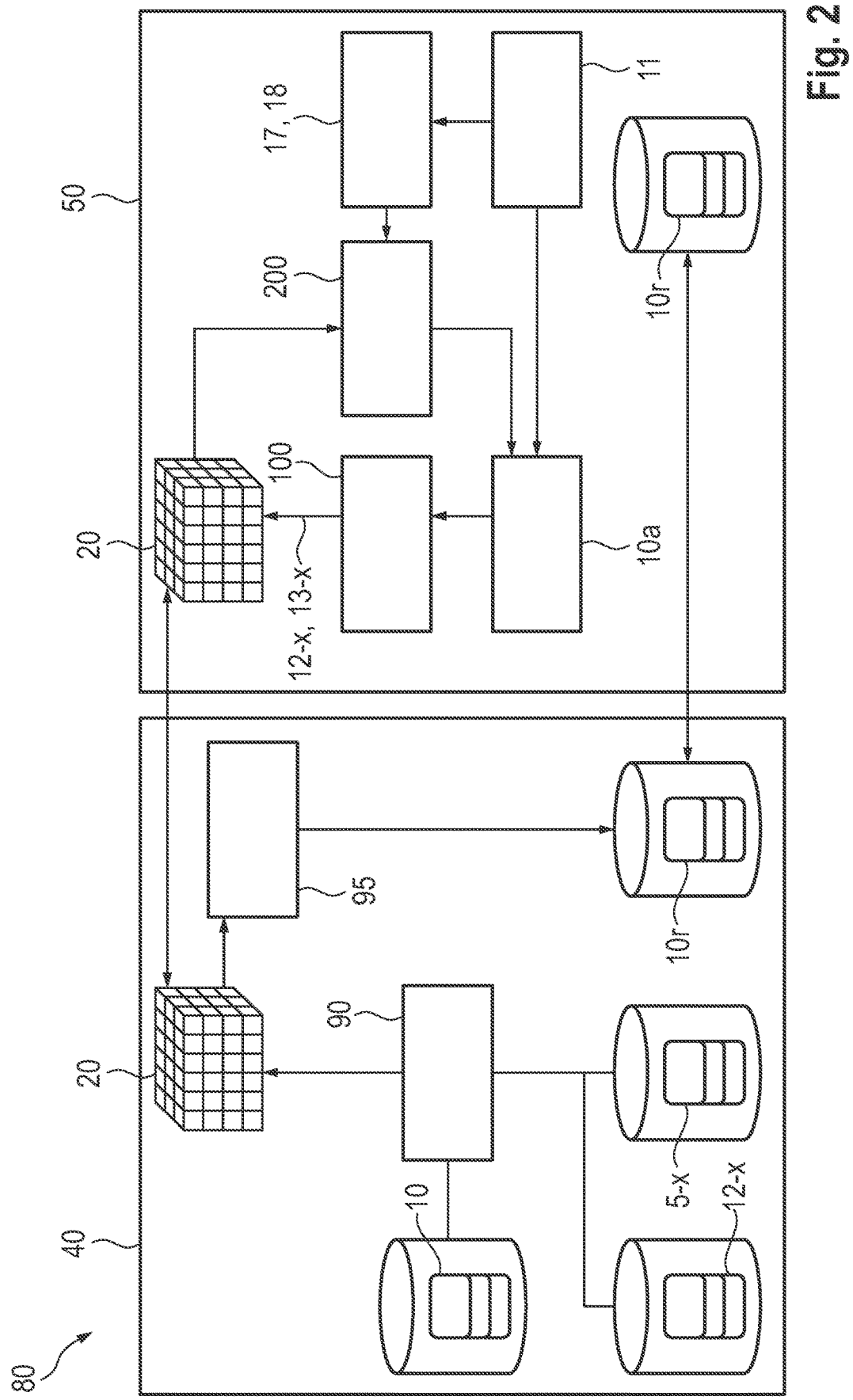
FIG. 2 shows a schematic representation of an embodiment to illustrate an embedding of a method into a system and a method for the partially automated or fully automated control of a vehicle with provision of robust AI-based information processing systems.

FIG. 2 shows a schematic representation to illustrate an embedding of the method into a system 80 and a method for the partially automated or fully automated control of a vehicle 50 with provision of robust AI-based information processing systems 10$r$.

In the method for the partially automated or fully automated control of a vehicle with provision of robust AI-based information processing systems 10$r$, a multi-dimensional data structure 20 is generated on a central server 40 from a plurality of AI-based information processing systems 10, a variety of testing methods 12-$x$, and a variety of data sets 5-$x$.

This takes place in a measure 90, in which for example a method for providing a data pool for assessing robustness of at least one AI-based information processing system 10 is executed, wherein at least one AI-based information processing system 10, at least one data set 5-$x$, at least one data augmentation definition, and at least one degree of difference definition are received as input parameters, wherein, based on the input parameters, a multi-dimensional data structure 20 is generated, wherein the dimensions and value ranges of the dimensions of the multi-dimensional data structure 20 are established by the received input parameters, and wherein each data point in the multi-dimensional data structure comprises a difference value determined by means of the at least one defined degree of difference, which difference value is determined in that the at least one defined degree of difference is formed between output data that were generated by the at least one AI-based information processing system 10 in each case for data of the at least one data set 5-$x$ and for the same data augmented by means of the at least one defined data augmentation, and wherein the generated multi-dimensional data structure 20 is provided so that a robustness of the at least one AI-based information processing system 10 may be assessed based on the difference values comprised by the multi-dimensional data structure 20.

On the basis of the multi-dimensional data structure 20 and the test results saved therein (i.e., the difference values) and, if applicable, additional meta information (context information, properties of the sensor data or data sets, etc.), robust AI-based information processing systems 10$r$ may then be ascertained for specific conditions in that the test results, for example the saved difference values, in the multi-dimensional data structure 20 are evaluated accordingly. For this purpose, test results, for example the difference values, may be, for example, combined and compared with thresholds for robustness or respectively reliability. Depending on the result of the comparison, the AI-based information processing system 10 is classified as robust or not.

Checking and/or assessing the AI-based information processing systems 10 on the central server 40 takes place in a measure 95. In this measure 95, for example a method for assessing and certifying a robustness of an AI-based information processing system 10 is executed, wherein the multi-dimensional data structure 20 related to the AI-based information processing system 10 is received, wherein difference values, determined in each case at least by means of at least one degree of difference, between output data of the AI-based information processing system 10 that were obtained for data and augmented data, are saved in the multi-dimensional data structure 20 depending on at least the dimensions of data set 5-$x$, data augmentation definition(s), and degree of difference definition(s), wherein at least one robustness of the AI-based information processing system 10 is determined from at least one selection of the difference values and is compared with at least one robustness requirement, and wherein, based on a result of the comparison, the AI-based information processing system 10 is either rejected, assessed again with a changed multi-dimensional data structure 20, or certified as robust. This takes place for all AI-based information processing systems 10.

The generated multi-dimensional data structure 20 and the AI-based information processing systems 10$r$ classified as robust in measure 95 are transmitted to at least one vehicle 50. A vehicle 50 in this case may be a test vehicle or a production vehicle.

In a measure 100, the method described in this disclosure for checking an AI-based information processing system 10$a$ used or respectively active during the partially automated or fully automated control of a vehicle 50 is performed during use. In this case, an output of the active AI-based information processing system 10$a$, as already described in the preceding, is checked by means of at least one testing method 12-$x$. Obtained test results are saved in the multi-dimensional data structure 20. For example, the test results 13-$x$ are added to the multi-dimensional data structure 20 with a reference to the active AI-based information processing system 10$a$ and to the testing method 12-$x$ used in each case. The multi-dimensional data structure 20 may then be synchronized with the multi-dimensional data structure 20 on the central server 40 and/or with a multi-dimensional data structure 20 of other vehicles.

Furthermore, it is provided in a measure 200 that, to evaluate captured sensor data 11, for example by means of camera images captured by a camera, the AI-based information processing method 10 that is the most robust under given conditions (for example properties of the sensor data and/or a given context) is selected from the AI-based information processing methods 10 and activated. Properties in the sensor data 11 may be detected, for example, by means of a property detection apparatus 18 and/or an interference detection apparatus 17, which detects, for example, adversarial perturbations in the sensor data 11. The selection takes place in this case on the basis of the test results 13-$x$ saved in the multi-dimensional data structure 20, wherein a robustness of the AI-based information processing systems 10$r$ considered for the evaluation is determined and assessed on the basis of the test results 13-$x$ saved in each case. For example, at least one degree of robustness may be determined from difference values saved in the multi-dimensional data structure 20 and/or from the test results. The determined at least one degree of robustness may be compared with at least one robustness requirement. The most robust AI-based information processing system 10$r$, for example the AI-based information processing system 10$r$ with the highest robustness value, is then activated for use on the currently captured sensor data 11 and for this purpose loaded, for example, into a memory of a first control circuit 52 (FIG. 1) of the vehicle 50 or activated in the control circuit 52 for use and then provides the active AI-based information processing system 10$a$.

The system 80 or respectively the method illustrated in FIG. 2 allows the use of the AI-based information processing system 10$r$ that is the most robust in each case under given conditions (properties of the sensor data 11 and/or a context, etc.) for the evaluation of the captured sensor data 11. A selection is always made in this case for example taking into account current conditions in the vehicle 50. By means of the method described in this disclosure and the associated device for checking an AI-based information processing system 10$r$ used in the partially automated or fully automated control of a vehicle 50, the multi-dimensional data structure 20 used thereby may be expanded continuously to include additional test results of unmonitored testing methods, which during the use of a currently active AI-based information processing system 10$a$ are obtained. In this way, a data pool for checking and/or assessing a robustness of an AI-based information processing system 10, 10$r$, 10$a$ may be expanded and/or updated continuously or in steps.

LIST OF REFERENCE NUMERALS

1 Device
2 Testing circuit
3 Computing apparatus (Computer)
4 Memory
5-$x$ Data set
6 (Decentralized) database
10 AI-based information processing system
10$a$ Active AI-based information processing system
10$r$ Robust AI-based information processing system
11 Sensor data
12-$x$ Testing method
13-$x$ Test result
15 Context information
16 Property
17 Interference detection apparatus
18 Property determination apparatus
19 Context determination apparatus
20 Multi-dimensional data structure
30 Output
40 Central server
41 (Centralized) database
50 Vehicle
51 Sensor
52 First control circuit
53 Controller
54 Second control circuit
80 System
90 Measure
95 Measure
100 Measure
200 Measure The invention has been described in the preceding using various exemplary embodiments.

Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for checking an AI-based information processing system used in a partially automated or fully automated control of a vehicle, comprising:
   providing, by at least one sensor of the vehicle, sensor data of detected surroundings;
   evaluating the sensor data by an on-board AI-based information processing system arranged in a first control circuit of the vehicle;
   generating, from the evaluated sensor data, at least one control output for the partially automated or fully automated control of the vehicle;
   providing the control output to a controller of an automated control system of the vehicle;
   providing the control output additionally to a second control circuit of the vehicle;
   checking, by the second control circuit during automated control of the vehicle, the control output of the AI-based information processing system using at least one testing method; and
   storing a test result of the at least one testing method with a reference to the tested control output and to the at least one testing method used, in a multi-dimensional data structure in a database arranged in the vehicle.

2. The method of claim 1, wherein the output is at least one object from the sensor data and classified by the AI-based information processing system, or a controlling output.

3. The method of claim 1, further comprising: determining at least one context information of a context in which the sensor data is captured, wherein the at least one context information is saved in the multi-dimensional data structure in addition to the test result.

4. The method of claim 1, further comprising determining properties of the sensor data, wherein the determined properties are saved in the multi-dimensional data structure in addition to the test result.

5. The method of claim 1, wherein the at least one testing method comprises one or more of determining and checking a consistency of the at least one output over time.

6. The method of claim 1, wherein the at least one testing method comprises one or more of determining and checking a confidence of the at least one output.

7. The method of claim 1, wherein the at least one testing method comprises checking a plausibility of the at least one output.

8. The method of claim 1, wherein the multi-dimensional data structure is synchronized with one or more of a centralized multi-dimensional data structure that is stored in a centralized database on a central server and with a decentralized multi-dimensional data structure that is stored in a decentralized database.

9. The method of claim 1, wherein the AI-based information processing system provides a function for one or more of an automated driving of the vehicle, for a driver assistance system of the vehicle, for detecting surroundings, and for sensing surroundings.

10. The method of claim 1, wherein the AI-based information processing system is a neural network or comprises at least one neural network.

11. A device for checking an AI-based information processing system used in a partially automated or fully automated control of a vehicle, comprising:
    at least one sensor that is configured to provide sensor data of detected surroundings in an environment of the vehicle;
    an on-board AI-based information processing system arranged in a first control circuit of the vehicle, which system is configured to evaluate the sensor data and, from the evaluated sensor data, to generate and provide at least one output;
    a controller that is configured to receive the provided output as a control parameter for the partially automated or fully automated control of the vehicle; and
    a testing circuit arranged in a second control circuit of the vehicle, which testing circuit is configured to receive the provided output and during automated control of the vehicle, to check the control output of the AI-based information processing system using at least one testing method, and to store a test result of the at least one testing method, with a reference to the tested control output and to the at least one testing method used, in a multi-dimensional data structure in a database arranged in the vehicle.

12. A system for checking an AI-based information processing system used in a partially automated or fully automated control of a vehicle, comprising at least the device of claim 11 and a central server, wherein at least one multi-dimensional data structure is saved in a centralized database on a central server, and wherein the central server is configured for one or more of: generating the multi-dimensional data structure, transmitting the multi-dimensional data structure to the device, and synchronizing the at least one multi-dimensional data structure with a multi-dimensional data structure of the at least one device.

13. The method of claim 1, wherein the automated control system comprises one or more of a trajectory planner or an actuator control system of the vehicle.

14. The method of claim 2, wherein the controlling output comprises one or more of a steering angle, a speed, or a trajectory.

15. The method of claim 2, further comprising: determining at least one context information of a context in which the sensor data is captured, wherein the at least one context information is saved in the multi-dimensional data structure in addition to the test result.

16. The method of claim 2, further comprising determining properties of the sensor data, wherein the determined properties are saved in the multi-dimensional data structure in addition to the test result.

17. The method of claim 3, further comprising determining properties of the sensor data, wherein the determined properties are saved in the multi-dimensional data structure in addition to the test result.

18. The method of claim 2, wherein the at least one testing method comprises one or more of determining and checking a consistency of the at least one output over time.

19. The method of claim 3, wherein the at least one testing method comprises one or more of determining and checking a consistency of the at least one output over time.

20. The method of claim 4, wherein the at least one testing method comprises one or more of determining and checking a consistency of the at least one output over time.

* * * * *